(12) United States Patent
Moradnia et al.

(10) Patent No.: US 11,891,126 B2
(45) Date of Patent: Feb. 6, 2024

(54) ACTIVE REAR DIFFUSER FOR VEHICLE

(71) Applicant: Honda Motor Co., Ltd., Tokyo (JP)

(72) Inventors: Pirooz Moradnia, Dublin, OH (US); Matthew L. Metka, Plain City, OH (US); Benjamin Bowlby, Dublin, OH (US); Connor J. Torris, Columbus, OH (US); David J. Rose, West Mansfield, OH (US); Pratap Thamanna Rao, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 17/410,313

(22) Filed: Aug. 24, 2021

(65) Prior Publication Data

US 2023/0069094 A1 Mar. 2, 2023

(51) Int. Cl.
*B62D 35/00* (2006.01)

(52) U.S. Cl.
CPC .................................. *B62D 35/007* (2013.01)

(58) Field of Classification Search
CPC ...... B62D 35/02; B62D 37/02; B62D 35/007; Y02T 10/88
See application file for complete search history.

(56) References Cited

U.S. PATENT DOCUMENTS

| | | | |
|---|---|---|---|
| 4,810,022 A | 3/1989 | Takagi et al. | |
| 6,196,620 B1 | 3/2001 | Haraway, Jr. | |
| 6,230,836 B1 | 5/2001 | Cowan et al. | |
| 7,717,494 B2 | 5/2010 | Nagahama | |
| 8,366,178 B2 | 2/2013 | Yamagishi et al. | |
| 8,668,245 B2 | 3/2014 | Kakiuchi et al. | |
| 8,727,423 B2 | 5/2014 | Keyes | |
| 8,882,176 B2 | 11/2014 | Froling et al. | |
| 9,283,999 B2 | 3/2016 | Wolf | |
| 9,469,354 B1 | 10/2016 | Ciccone | |
| 9,469,355 B2 | 10/2016 | Wolf | |
| 9,527,535 B1 | 12/2016 | Cha et al. | |
| 9,561,827 B2 | 2/2017 | Parry-Williams et al. | |
| 9,713,947 B2 | 7/2017 | Irwin et al. | |
| 9,714,059 B2 | 7/2017 | Fahland et al. | |
| 9,738,328 B2 | 8/2017 | Fahland et al. | |

(Continued)

FOREIGN PATENT DOCUMENTS

| | | | |
|---|---|---|---|
| DE | 102011085933 A1 * | 5/2013 | ............. B62D 35/02 |
| DE | 102013101296 A1 | 8/2014 | |

(Continued)

*Primary Examiner* — Lori Lyjak
(74) *Attorney, Agent, or Firm* — Plumsea Law Group, LLC (57) ABSTRACT

A vehicle having a vehicle body including a front portion, an opposing rear end portion and an underbody portion configured to face a road surface; and an active diffuser assembly disposed on the underbody portion and configured to control ambient airflow passing under the vehicle body. The active diffuser assembly includes a fixed panel disposed on the vehicle underbody; a movable active panel disposed adjacent the fixed panel and configured for selective movement to be deployed away from the vehicle body and to be retracted toward the vehicle body for stowage; and an actuator configured to deploy and retract the movable active panel, the fixed panel and the movable active panel defining a continuous plane when the movable panel is in the stowed position.

20 Claims, 12 Drawing Sheets

(56) References Cited

U.S. PATENT DOCUMENTS

| | | |
|---|---|---|
| 9,783,247 B2 | 10/2017 | Kim |
| 9,802,658 B2 | 10/2017 | Wofl |
| 9,828,044 B2 | 11/2017 | Heil et al. |
| 9,902,438 B2 | 2/2018 | Bray et al. |
| 9,937,966 B1 | 4/2018 | Yoon et al. |
| 9,957,000 B1 | 5/2018 | Ehirim |
| 10,040,493 B2 | 8/2018 | Wolf |
| 10,179,613 B2 | 1/2019 | Gaylard et al. |
| 10,300,966 B2 | 5/2019 | Cha et al. |
| 10,308,294 B2 | 6/2019 | Yoon et al. |
| 10,589,804 B2 | 3/2020 | Del Gaizo et al. |
| 10,676,140 B2 | 6/2020 | Wolf et al. |
| 10,679,437 B1 | 6/2020 | Dudar |
| 11,541,949 B2 * | 1/2023 | Beierl ................. B62D 35/007 |
| 2014/0097638 A1 * | 4/2014 | Froling ................. B62D 35/02 |
| | | 296/180.1 |
| 2017/0190364 A1 * | 7/2017 | Fahland ................. B62D 37/02 |
| 2021/0387685 A1 * | 12/2021 | Grebel ................. B62D 35/02 |

FOREIGN PATENT DOCUMENTS

| | | | | |
|---|---|---|---|---|
| DE | 102013105843 A1 * | 12/2014 | ........... | B62D 35/007 |
| ES | 2281713 T3 * | 10/2007 | ........... | B62D 35/005 |
| KR | 101540042 B1 | 5/2015 | | |
| KR | 20150057811 A | 5/2015 | | |
| KR | 101584673 B1 | 1/2016 | | |
| KR | 20170022282 A | 3/2017 | | |
| WO | 2004089729 A1 | 10/2004 | | |
| WO | 201902795 A1 | 1/2019 | | |
| WO | WO-2019016483 A1 * | 1/2019 | ........... | B62D 35/007 |
| WO | 201977101 A1 | 4/2019 | | |
| WO | 2019229200 A1 | 12/2019 | | |
| WO | 2020079263 A1 | 4/2020 | | |

\* cited by examiner

ACTIVE REAR DIFFUSER FOR VEHICLE

BACKGROUND

The present disclosure relates to a rear diffuser for a vehicle and, more particularly, a rear diffuser having an active panel configured for outward and/or downward movement to improve the air flow under the vehicle.

Over the past several years, automobile design has significantly evolved with more focus on aerodynamics and airflow around the automobile. With these advancements in aerodynamic design, the use of elements such as a diffuser have also increased. The diffuser is usually located at the rear of the vehicle, and one of its aerodynamic purposes is to increase the static air pressure behind the vehicle by altering the underbody airflow and recirculation near the rear of the vehicle. That is, the diffuser increases the static pressure of the air behind the vehicle and thus reduces the pressure deficit on the rear surfaces and improves the aerodynamic drag.

Rear diffusers that are fixed on a vehicle are limited in size and shape by the desired aesthetic appearance and styling of the vehicle. Certain design restrictions may also apply in order to meet state and local legal requirements for vehicle road clearance, approach and departure angles, overall length, and the like.

There is thus a need in the art for a system and method that can provide all the aerodynamic benefits of a conventional rear diffuser but not detract from the overall aesthetic appeal and styling of the vehicle or test the legal constraints for a given vehicle.

SUMMARY

The active diffuser assembly according to an exemplary embodiment of the disclosure is configured to have a stowed configuration generally following the contour of the rear bumper or rear end of the vehicle. In the stowed position, the diffuser assembly does not alter or interfere with the intended styling of the vehicle and it conforms to all requirements for approach angle, ground lines, overall length, and the like. The diffuser assembly includes a fixed diffuser portion and an active diffuser blade or panel that is extended relative to the fixed diffuser portion so as to create a gap or spacing between the rear bumper of the vehicle and the active diffuser panel. Providing the gap allows the air to flow over both an upper surface and a lower surface of the active panel and serves to balance the strong downwash flow coming off the roof of the vehicle with an upward flow from underneath the vehicle. The deployed diffuser thereby reduces the lift force and increases the downward force on the rear axle of the vehicle to improve the aerodynamic drag.

In one aspect, the disclosure provides a vehicle having a vehicle body including a front portion, an opposing rear end portion and an underbody portion configured to face a road surface; and an active diffuser assembly disposed on the underbody portion and configured to control ambient airflow passing under the vehicle body. The active diffuser assembly includes a fixed panel disposed on the vehicle underbody; a movable active panel disposed adjacent the fixed panel and configured for selective movement to be deployed away from the vehicle body and to be retracted toward the vehicle body for stowage; and an actuator configured to deploy and retract the movable active panel. The fixed panel and the movable active panel define a continuous plane when the movable panel is in the stowed position.

A further aspect provides system and method for deploying an active diffuser assembly on a vehicle comprises providing an active diffuser assembly including a fixed diffuser portion and a movable active panel, positioning the fixed diffuser portion on the vehicle, actuating the active diffuser assembly to deploy the movable active panel away from the vehicle body, and deploying the movable active panel away from the vehicle body a predetermined amount and forming a gap between the vehicle and the movable active panel such that ambient airflow passes over a first upper surface of the movable active panel and a second lower surface of the movable active panel.

In another aspect, the disclosure provides a vehicle body including a front portion, an opposing rear end portion and an underbody portion configured to face a road surface; and an active diffuser assembly configured to control ambient airflow passing under the vehicle body. The active diffuser assembly includes a fixed diffuser portion disposed on the vehicle body and configured to partially define a diffuser chamber including an opening positioned at the rear end portion of the vehicle body; a movable active panel disposed within the diffuser chamber and configured for selective movement to be deployed outward from the opening of the diffuser chamber and away from the vehicle body and to be retracted inward through the opening into the diffuser chamber and toward the vehicle body for stowage; and an actuator system configured to deploy and retract the movable active panel from within the diffuser chamber.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
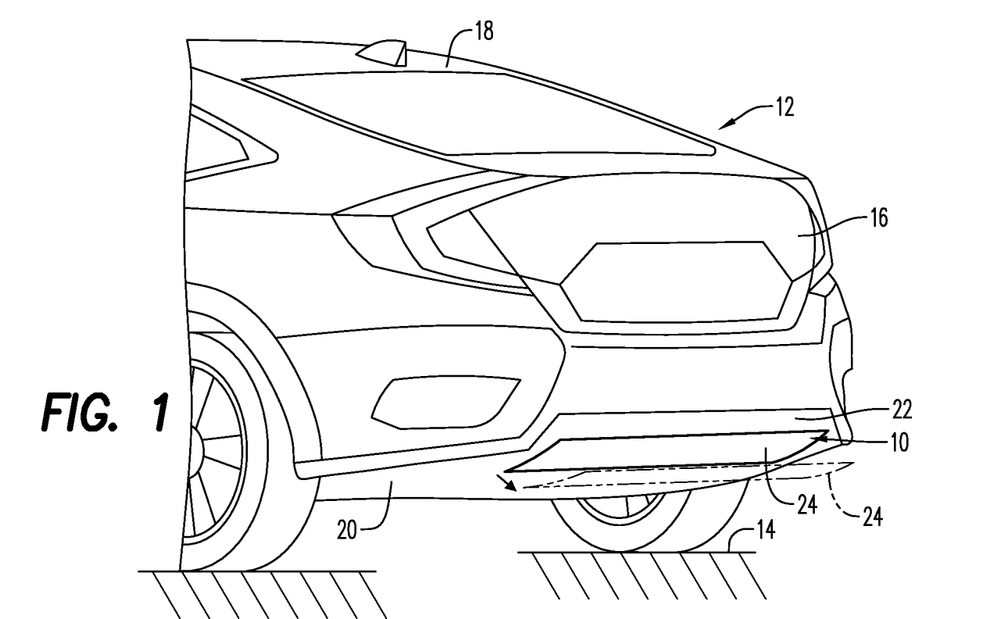
FIG. 1 is a schematic rear perspective view of an active rear diffuser for a vehicle according to a first exemplary embodiment of the disclosure herein.
Figure 2:
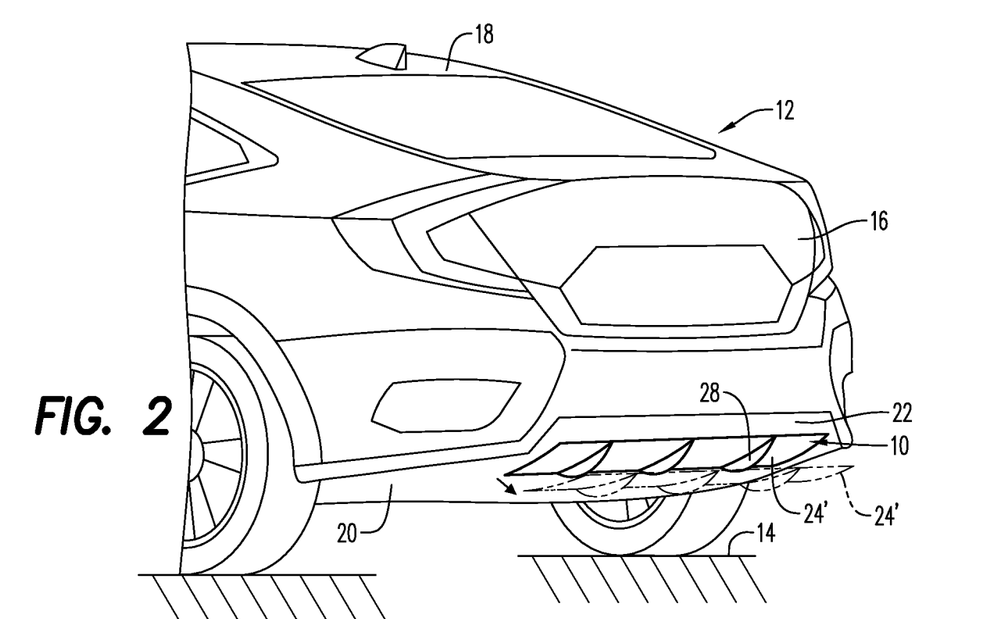
FIG. 2 is a schematic rear perspective view of a modified active rear diffuser for a vehicle according to the first exemplary embodiment of the disclosure herein.

Referring to FIGS. 1 and 2, wherein like reference numbers refer to like components, an active diffuser assembly according to a first exemplary embodiment of the disclosure is shown generally by reference numeral 10. The vehicle 12 includes a front end (not shown) and an opposing rear end 16. The vehicle 12 further includes a vehicle roof 18 and a vehicle underbody 20 facing a road surface 14. As understood by one skilled in the art, when the vehicle 12 is in forward motion, the front end is configured to face oncoming ambient airflow A which then travels under the vehicle 12 between the vehicle underbody 20 and the road surface 14. FIGS. 1 and 2 schematically show the active diffuser assembly 10 on the motor vehicle 12 disposed relative to the road surface 14. The active diffuser assembly 10 includes a fixed portion or panel 26 (see also FIG. 7) secured below the vehicle bumper 22 and an active panel or blade 24, 24' configured for movement relative to the fixed portion 26. The fixed portion or panel 26 includes a first surface 26a and a second surface 26c joined by a connecting surface 26b to thereby define a pocket 27 for the active blade 24. That is, the second surface 26c of the fixed panel 26 has a shape substantially the same as the shape of the active blade 24 and thereby nests the active panel or blade 24 when it is stowed so that the air diffuser assembly defines a continuous air attachment surface. The active blade 24 can then extend rearward, downward, or downward and rearward, as described below in greater detail. Similarly, an active blade 24" having an airfoil shape is shown in FIG. 8 and the second surface 26c has a configuration substantially similar to the airfoil shape of the active blade 24" such that the active blade 24" nests within the pocket 27 of the fixed portion 26 when it is stowed.

The active blade 24 in FIG. 1 provides a generally smooth surface whereas the active blade 24' in FIG. 2 includes one or more protruding vanes or fins 28 to help guide the direction of airflow and/or modify streamwise vorticity to help maintain flow attachment on the diffuser fin extension. While four fins 28 are illustrated in FIG. 2, an exemplary embodiment of the disclosure could have only two fins, or three fins, or more than four fins, as would be understood by one skilled in the art. The fins 28 stratify the air flow as it passes over the blade 24' and provide the air with a set direction of travel to stabilize the flow. The fins 28 thus aid in preventing the tendency of the airflow to become more turbulent as it exits, which decreases the vehicle efficiency by creating drag. The fins 28 are disposed generally perpendicular or vertical relative to the blade 24' and are not limited to any particular number, shape, configuration or relative orientation. That is, the fins 28 may be parallel as shown but could also be arranged to direct the airflow stream in a converging or diverging manner. The shape of the illustrated fins 28 can also be optimized as needed for any particular vehicle design or performance.

As shown in solid lines in FIGS. 1 and 2, the active diffuser assembly 10 is configured to have a stowed configuration generally following the contour of the rear bumper 22 or rear end 16 of the vehicle. In the stowed position, the diffuser assembly 10 does not alter or interfere with the intended styling of the vehicle and it conforms to all requirements for approach angle, ground lines, overall length, and the like. FIGS. 1 and 2 illustrate in dashed lines a deployed configuration in which an active panel 24, 24' of the diffuser assembly 10 has moved to an extended position in order to alter the air flow A as it passes beneath the underbody 20, and thereby improve the aerodynamic drag on the vehicle. In one exemplary embodiment of the disclosure, a controller will electronically actuate the active panel 24, 24' to extend when the vehicle 12 reaches a predetermined speed, such as, merely for example, 70 kph (43.5 mph), and to retract once again when the speed of the vehicle 12 decreases below a predetermined speed, such as, merely for example, 60 kph (37.2 mph), or a speed less than the deployment speed in order to reduce the system cycling. The controller can also actuate the active panel 24, 24' mechanically or pneumatically or by other means if desired. In further exemplary embodiments of the disclosure, other variable factors communicated to the controller such as, for example, the given drive mode, i.e., race mode or economical mode, steering input, acceleration, and the like, could also be used to determine desired actuation of the active panel 24, 24'. Still further, other sensory inputs can also be used to determine desired actuation of the active panel 24, 24' such as, including but not limited to, ambient temperature and humidity, rain, ice, snow, GPS location, and the like. Environmental inputs relating to temperature/humidity/ ice/snow are particularly relevant because snow and ice can accumulate on the active panel 24, 24' if it is deployed and then prevent the active panel 24, 24' from being retracted and properly stowed. Exemplary systems for extending and retracting the active panels 24, 24' of the diffuser assembly 10 are discussed in further detail below.

Referring also to FIGS. 3-6, the active panel or blade is shown in four alternative deployment arrangements. While only panel 24 is shown in FIGS. 3-6, the same deployment arrangements discussed below also pertain to panel 24'.

Figure 3:
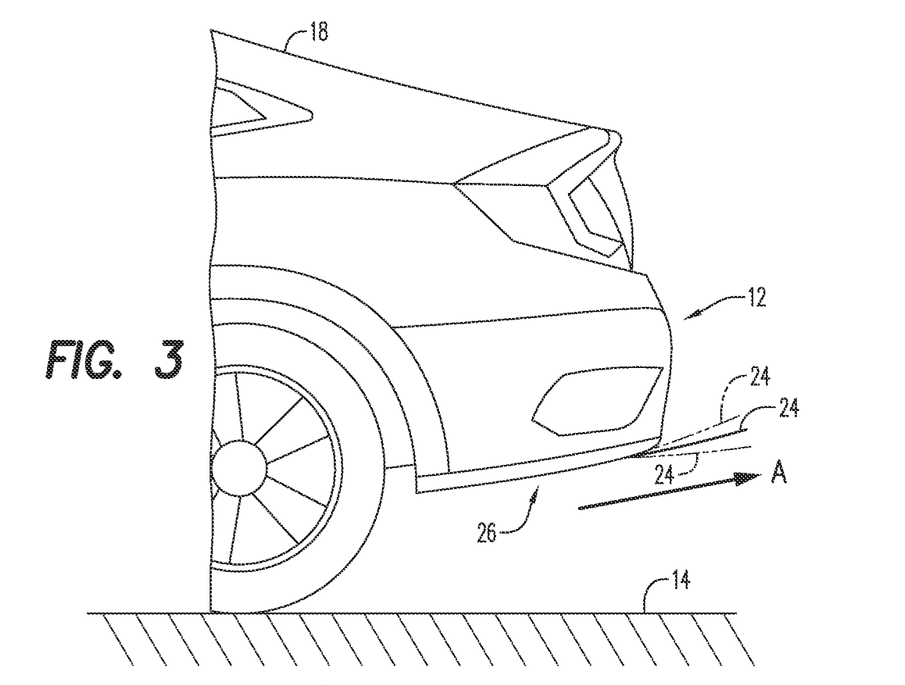
FIG. 3 is a schematic side view of the active rear diffuser according to the first exemplary embodiment when configured for deployment in a first manner of operation.
Figure 7:
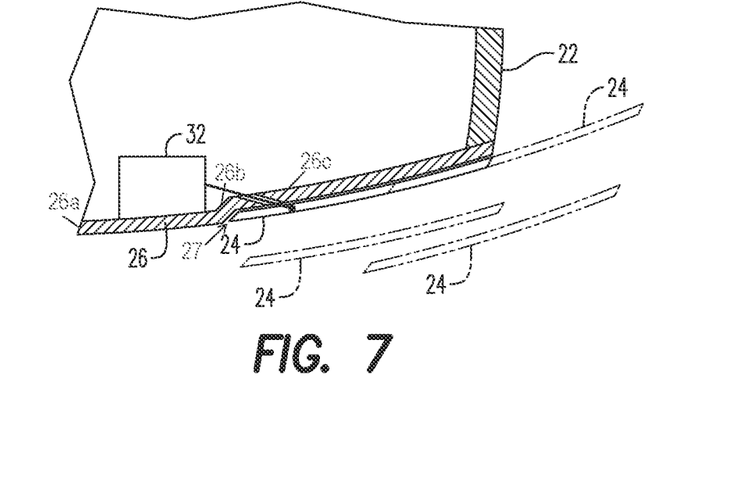
FIG. 7 is a schematic cross section illustrating movement of the active rear diffuser into several alternative deployed positions.
Figure 8:
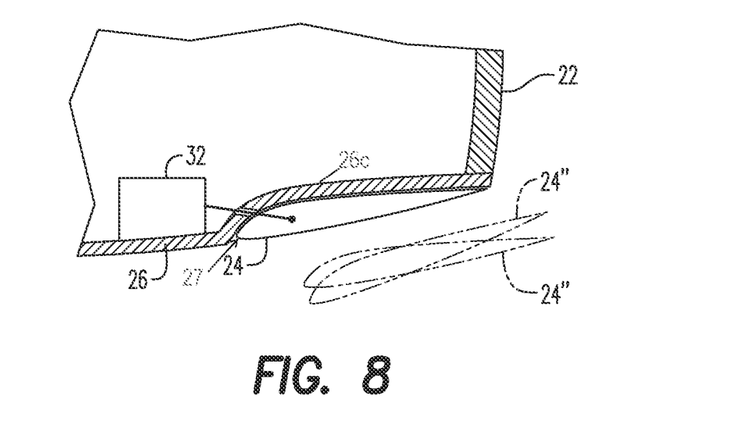
FIG. 8 is a schematic cross section illustrating movement of a modified active rear diffuser into several alternative deployed positions.

In FIG. 3, the active panel 24 (shown in solid line) extends rearward and generally in-line with the fixed diffuser portion 26 (see also FIG. 7). In this first deployment arrangement, there is no gap or spacing in the lengthwise direction between the body of the vehicle 12 and the active diffuser panel 24. The diffuser panel 24 may also be disposed at an angle upwards or downwards relative to the body of the vehicle, depending upon whichever proves aerodynamically more beneficial, while also not creating a gap or spacing in the lengthwise direction. In FIG. 3, the diffuser panel 24 is shown in broken lines to illustrate an exemplary angled upwards and angled downwards orientation, the angle being determined based upon the desired aerodynamic outcome.

Figure 4:
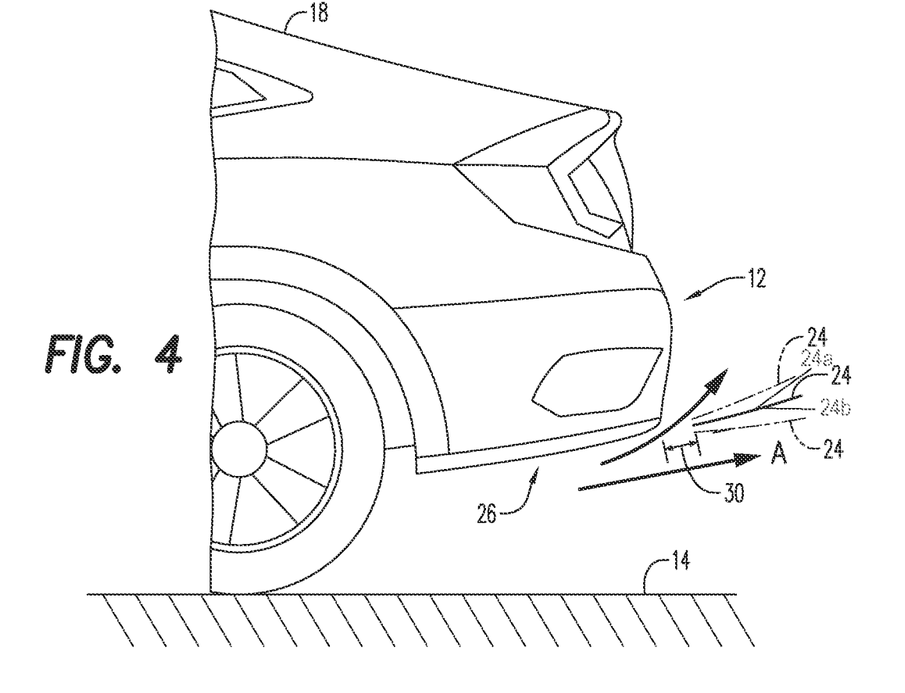
FIG. 4 is a schematic side view of the active rear diffuser according to the first exemplary embodiment when configured for deployment in a second manner of operation.

In FIG. 4, the active panel 24 (shown in solid line) also extends rearward and generally in-line with the fixed diffuser portion 26 (see also FIG. 7). In this second deployment arrangement, however, the panel 24 is further extended so as to create a gap 30 or spacing in the lengthwise direction between the rear bumper 22 of the vehicle 12 and the active diffuser panel 24. The diffuser panel 24 may also be disposed at an angle upwards or downwards relative to the fixed diffuser of the vehicle, depending upon whichever proves aerodynamically more beneficial, while also creating a gap 30 or spacing in the lengthwise direction. In FIG. 4, the diffuser panel 24 is shown in broken lines to illustrate an exemplary angled upwards and angled downwards orientation, the angle being determined based upon the desired aerodynamic outcome. Providing the gap 30 allows the air A to flow over both an upper surface 24a and a lower surface 24b of the active panel 24 and serves to balance the strong downwash flow coming off the roof 18 of the vehicle with an upward flow from underneath the vehicle. The deployed diffuser 10 thereby reduces the rear axle lift force of the vehicle to improve the aerodynamic drag. This concept can also be used to provide downforce on demand (with possible drag penalty) for racing or high performance applications. For example, the system may be deployed during the cornering phases of a track, while retracting during the high speed straightaways. The resultant effect of the active diffuser assembly 10 on drag and lift thus depend largely on the tuning details and angles of application.

Figure 5:
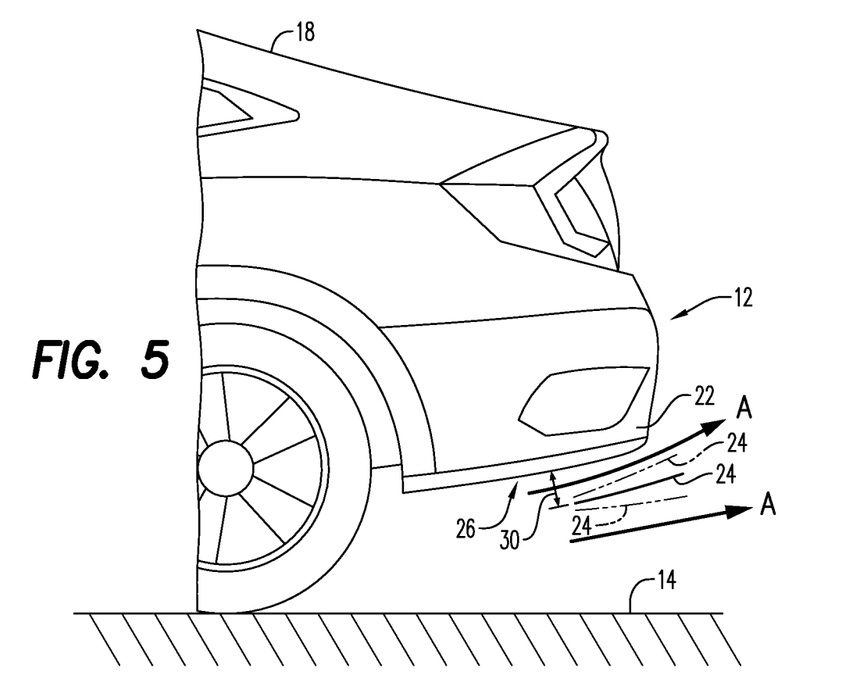
FIG. 5 is a schematic side view of the active rear diffuser according to the first exemplary embodiment when configured for deployment in a third manner of operation.

In FIG. 5, the active panel 24 (shown in solid line) extends downward from the fixed diffuser portion 26 (see also FIG. 7), i.e., in a general direction toward the ground surface of the road 14. In this third deployment arrangement, the panel 24 creates a gap 30 or spacing in the vertical direction between the rear bumper 22 of the vehicle 12 and the active diffuser panel 24 but a majority of the panel 24 remains underneath the vehicle 12 such that the overall length of the vehicle is not substantially increased. The diffuser panel 24 may also be disposed at an angle upwards or downwards relative to the body of the vehicle, depending upon whichever proves aerodynamically more beneficial, while also creating a gap 30 or spacing in the vertical direction. In FIG. 5, the diffuser panel 24 is shown in broken lines to illustrate an exemplary angled upwards and angled downwards orientation, the angle being determined based upon the desired aerodynamic outcome. Providing the gap 30 allows the air A to flow over both the upper surface and the lower surface of the active panel 24 and serves to balance the strong downwash flow coming off the roof 18 of the vehicle with an upward flow from underneath the vehicle. The deployed diffuser 10 thereby reduces the lift force and increases the downward force on the rear axle of the vehicle to improve the aerodynamic drag.

Figure 6:
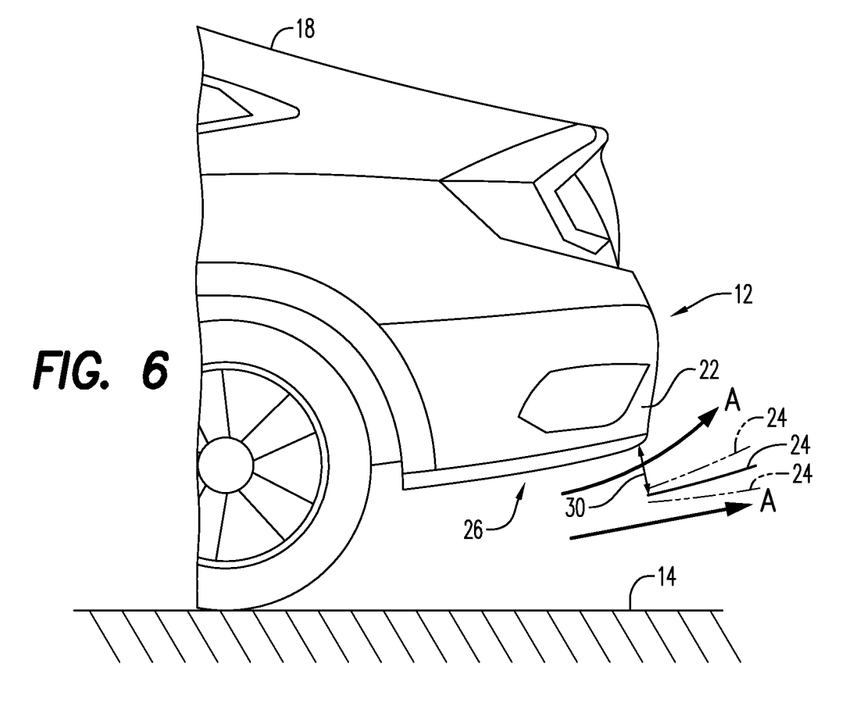
FIG. 6 is a schematic side view of the active rear diffuser according to the first exemplary embodiment when configured for deployment in a fourth manner of operation.

In FIG. 6, the active panel 24 (shown in solid line) extends from its stowed position both rearward in the lengthwise direction of the vehicle and downward from the fixed diffuser portion 26 (see also FIG. 7). In this fourth deployment arrangement, the panel 24 creates a gap 30 or spacing in the vertical direction between the rear bumper 22 of the vehicle 12 and a majority of the active diffuser panel 24 is extending rearward of the vehicle 12. The diffuser panel 24 may also be disposed at an angle upwards or downwards relative to the body of the vehicle, depending upon whichever proves aerodynamically more beneficial, while also creating a gap 30 or spacing in the vertical direction. In FIG. 6, the diffuser panel 24 is shown in broken lines to illustrate an exemplary angled upwards and angled downwards orientation, the angle being determined based upon the desired aerodynamic outcome. Providing the gap 30 allows the air A to flow over both the upper surface and the lower surface of the active panel 24 and serves to balance the strong downwash flow coming off the roof 18 of the vehicle with an upward flow from underneath the vehicle. The deployed diffuser 10 thereby reduces the lift force and increases the downward force on the rear axle of the vehicle to improve the aerodynamic drag.

Deployment of the active panel 24 is schematically illustrated in FIG. 7 in accordance with an exemplary embodiment of the disclosure. While only panel 24 is shown in FIG. 7, the same deployment system discussed here may also pertain to panel 24'. As shown in FIG. 7, the active diffuser assembly 10 includes the fixed portion 26 secured to the bumper 22 and/or underbody 20 of the vehicle and the active panel 24 which is shown in solid lines in the stowed position. As shown in broken lines, active panel 24 is configured for movement relative to the fixed portion 26 when the vehicle obtains a predetermined speed. This movement can be a rearward (translational) movement in-line with the fixed diffuser portion 26, corresponding to the deployment arrangements in FIGS. 3 and 4, a downward movement corresponding to the deployment arrangement of FIG. 5, or a downward and rearward movement corresponding to the deployment arrangement of FIG. 6. An actuator 32 is provided to control the movement of the active panel 24 and will be electronically activated when the vehicle 12 reaches a predetermined speed. Actuator 32 can include any linear actuator such as a motor, gears, links and the like as needed to perform the translational and vertical movement, or pneumatic cylinders, or any other type of system capable of providing the required movement.

The active blade 24" shown in FIG. 8 is designed with an airfoil shape to further enhance the aerodynamic properties of the diffuser 10. Similar to the other configurations for the active blade 24, 24', the active blade 24" is configured for movement relative to the fixed portion 26 when the vehicle obtains a predetermined speed. This movement can be a downward movement corresponding to the deployment arrangement of FIG. 5 or a downward and rearward movement corresponding to the deployment arrangement of FIG. 6. Unlike the active panels 24, 24', the airfoil shape of blade 24" is not conducive to a purely rearward (translational) movement in-line with the fixed diffuser portion 26, corresponding to the deployment arrangements in FIGS. 3 and 4. An actuator 32 is provided to control the movement of the active panel 24" and will be electronically activated when the vehicle 12 reaches a predetermined speed. Actuator 32 can include a motor, gears, or links and the like as needed to perform the translational and vertical movement, or pneumatic cylinders, or any other type of system capable of providing the required movement.

Figure 9:
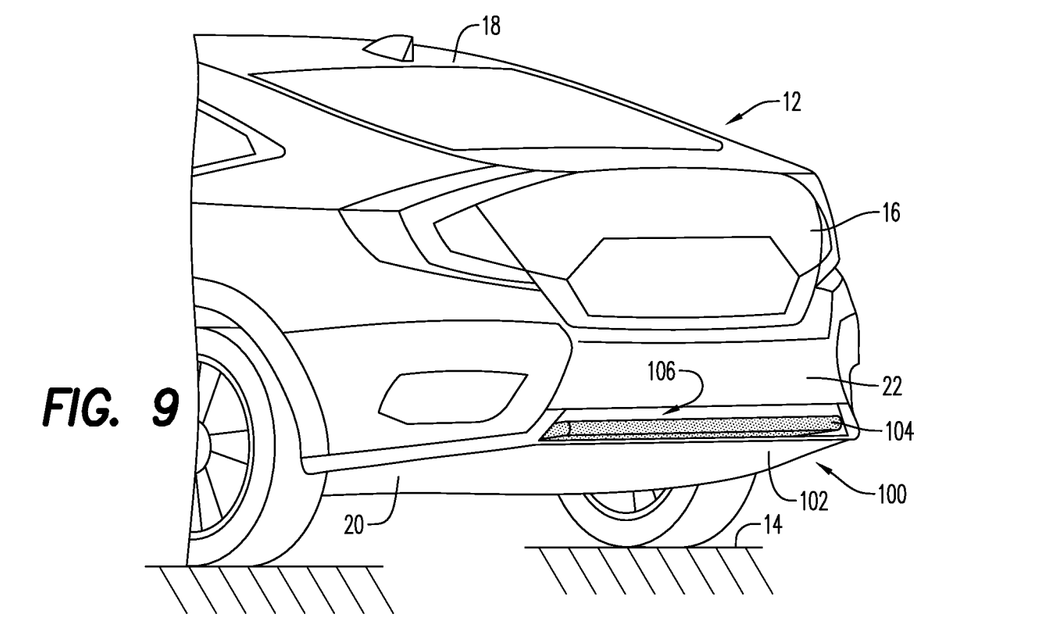
FIG. 9 is a schematic rear perspective view of an active rear diffuser for a vehicle in a stowed position according to a second exemplary embodiment of the disclosure herein.
Figure 10:
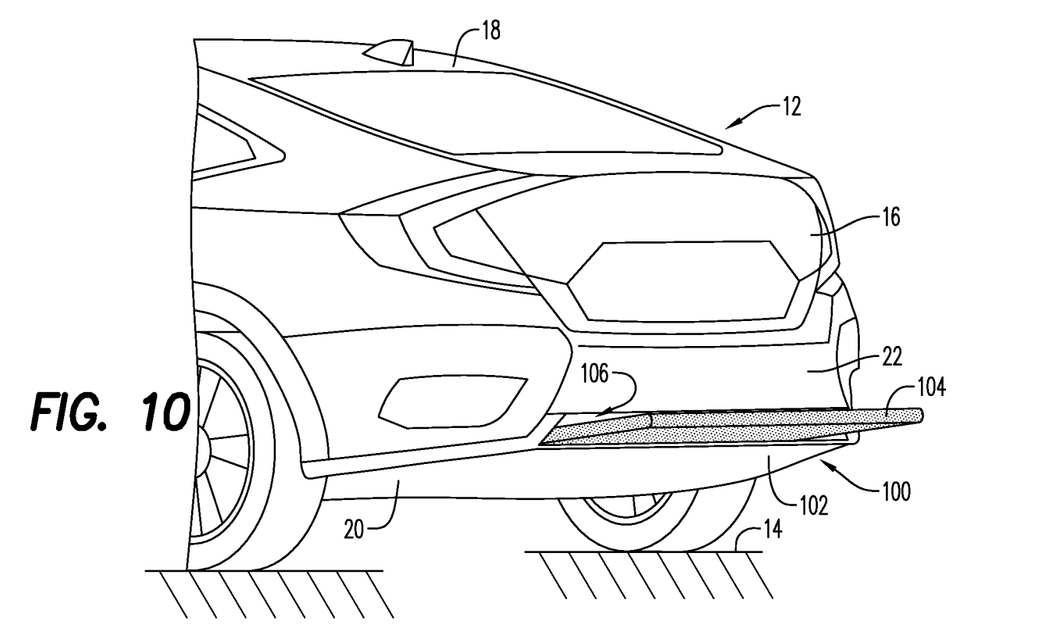
FIG. 10 is a schematic rear perspective view of an active rear diffuser for a vehicle in a deployed position according to the second exemplary embodiment of the disclosure herein.

An active rear diffuser assembly 100 is shown in a stowed position and a deployed position in FIGS. 9 and 10, respectively, according to a second exemplary embodiment of the disclosure herein. Diffuser assembly 100 redirects the topside air flow in the rearwards direction for better alignment with underbody air flow and thereby reduces mixing losses with underbody flow and improves drag. The active diffuser assembly 100 includes a fixed diffuser portion 102 disposed below the vehicle bumper 22 and an active panel or blade 104 configured for movement relative to the fixed portion 102. The diffuser assembly 100 includes a cavity or chamber 106 in which the active panel 104 is contained when in the stowed position, thus substantially concealing the active panel 104 from view when not in use. This is desirable because it allows the vehicle to have a diffuser assembly without altering the intended design styling of the vehicle or otherwise detracting from the aesthetic look of the vehicle. That is, when stowed, the active panel does not form part of the overall visible external surface of the vehicle and does not protrude significantly beyond the vehicle bumper.

The active diffuser blade 104 extends rearward a sufficient distance to separate the rear wake recirculation flow from the underbody, by redirecting the flow traveling downwards along the rear bumper in the rearwards direction. This allows more parallel mixing with the underbody airflow and reduces flow energy losses, which leads to lower drag. In this embodiment, there is a minimal gap at the interface with the bumper in order to maximize this effect.

Figure 13:
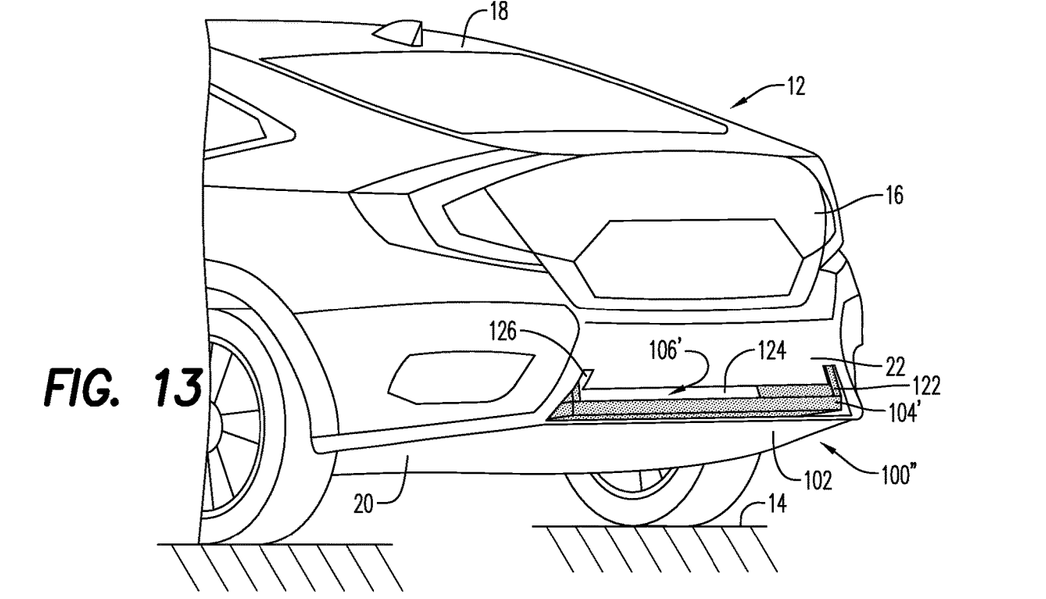
FIG. 13 is a schematic rear perspective view of an active rear diffuser for a vehicle in a stowed position according to a third exemplary embodiment of the disclosure herein.
Figure 14:
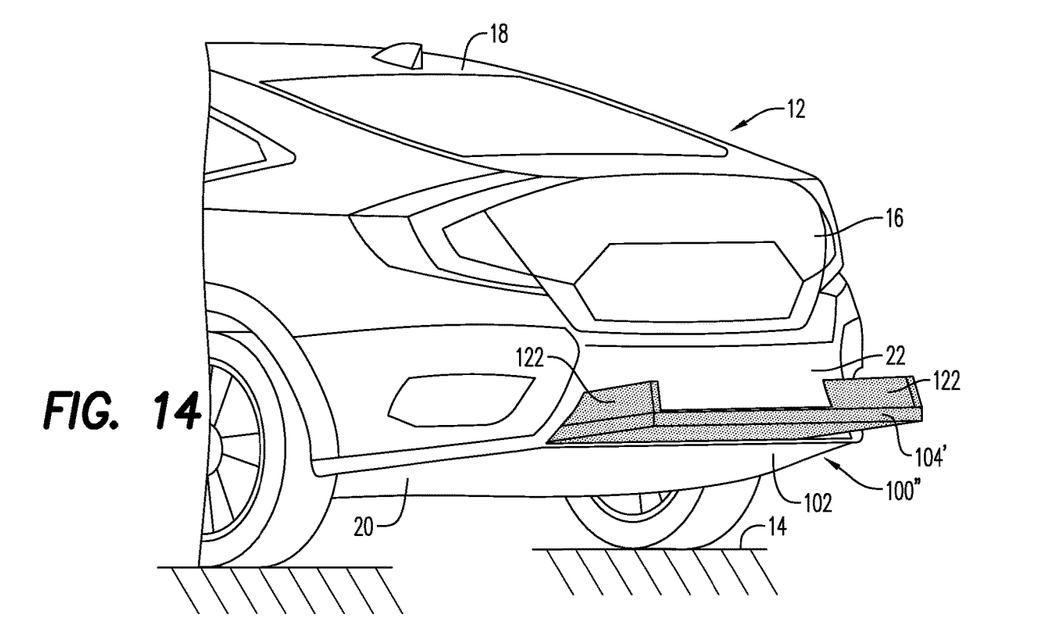
FIG. 14 is a schematic rear perspective view of an active rear diffuser for a vehicle in a deployed position according to the third exemplary embodiment of the disclosure herein.

An active rear diffuser assembly 100" is shown in a stowed position and a deployed position in FIGS. 13 and 14, respectively, according to a third exemplary embodiment of the disclosure. The active diffuser assembly 100" includes a fixed diffuser portion 102 disposed below the vehicle bumper 22 and an active panel or blade 104' configured for movement relative to the fixed portion 102. The active panel 104' further includes end plates 122 added onto the sides of diffuser blade 104' to prevent mixing of the recirculation wake in the lateral direction for potentially further improvement in reduced drag. The end plates 122 define vertical surfaces that nominally run the longitude length of the diffuser blade 104' with a height ranging from approximately 0.5 to 1.0 time the length of the blade 104. The diffuser assembly 100" includes a chamber 106' in which the active panel 104' is contained when in the stowed position, thus substantially concealing the active panel 104 from view when not in use. As shown in the exemplary embodiment, the chamber 106' includes a substantially horizontal portion 124 for containing the diffuser blade 104' and opposing vertical portions 126 for containing the end plates 122 when in the stowed configuration.

Figure 11A:
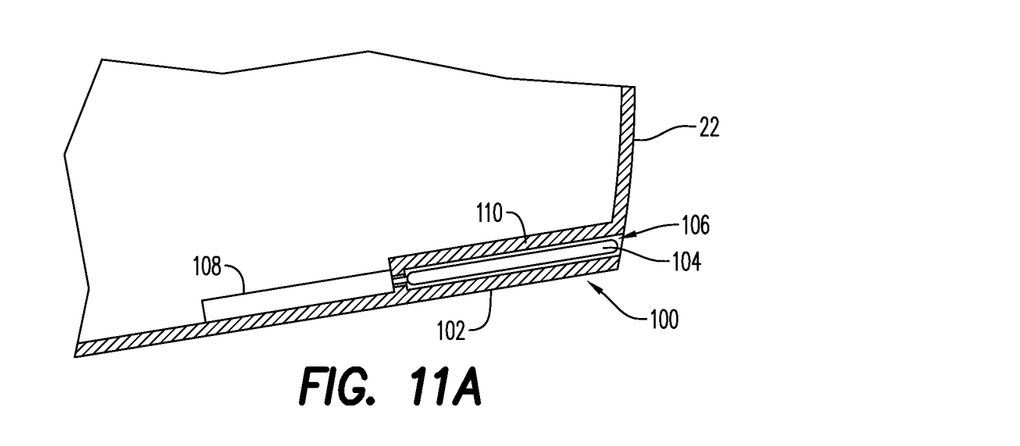
FIGS. 11A-11C illustrate a first system for deployment of the active rear diffuser according to the second exemplary embodiment of the disclosure.
Figure 11B:
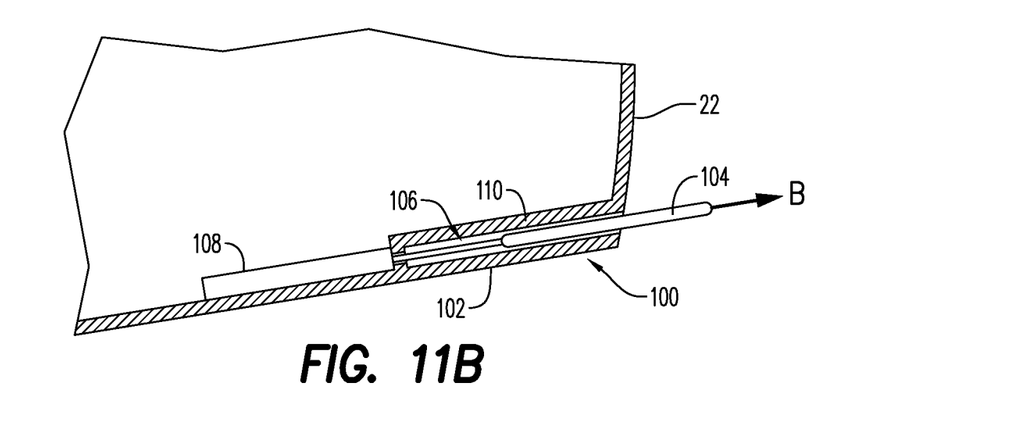
Figure 11C:
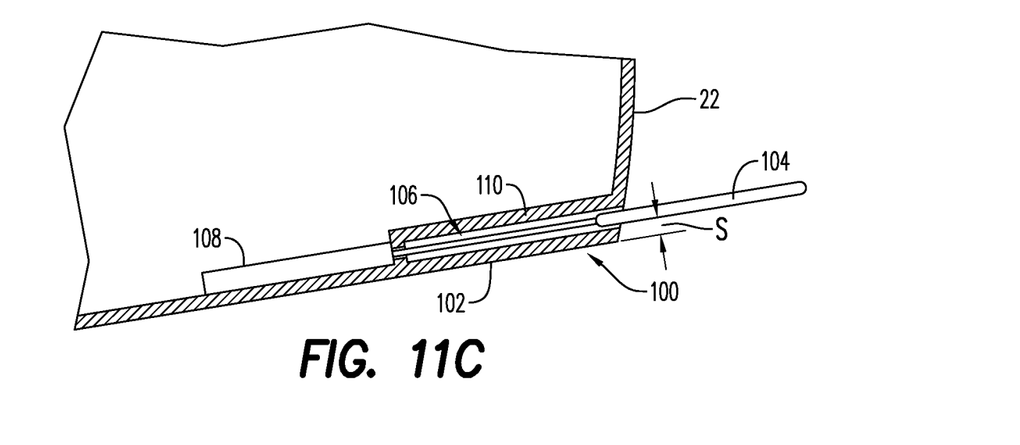

Referring also to FIGS. 11A-11C, one exemplary system for deployment of the active rear diffuser assembly 100 is shown, it being understood by one skilled in the art that the same or similar system can be used for deployment of active rear diffuser assembly 100'. In this system, guide rails 110 are provided on the upper surface of the chamber 106 and an actuator 108 is used to move the active panel 104 in the direction of arrow B from the stowed position within the chamber 106 to the deployed extended position protruding from the chamber. Actuator 108 is illustrated as a piston cylinder but the actuator may include a motor, gears, links or any other type of system capable of providing the required movement. The active panel 104 in this instance moves only in an in-line translational movement and thus, when fully deployed, the active panel is disposed above the fixed portion 102 defining the bottom of the chamber 106. As shown in FIG. 11C, active panel 104 is disposed a predetermined distance S above the bottom edge of the fixed portion 102.

Figure 12A:
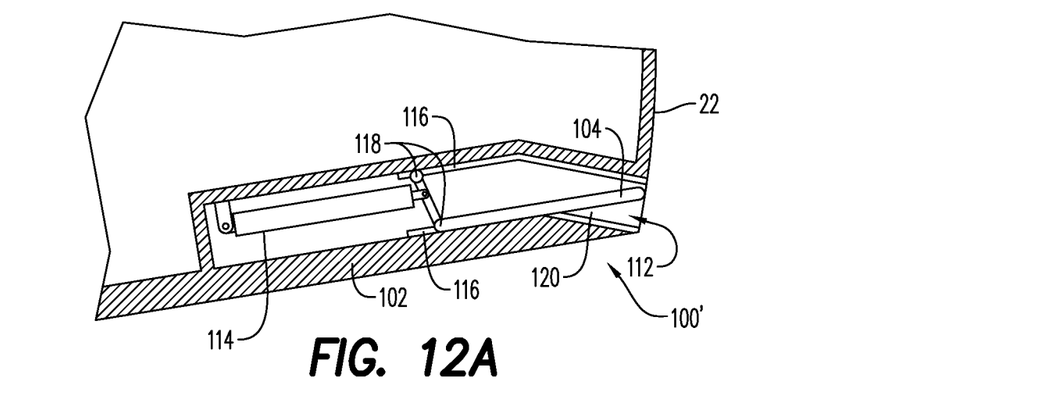
FIGS. 12A-12C illustrate a second system for deployment of the active rear diffuser according to the second exemplary embodiment of the disclosure.
Figure 12B:
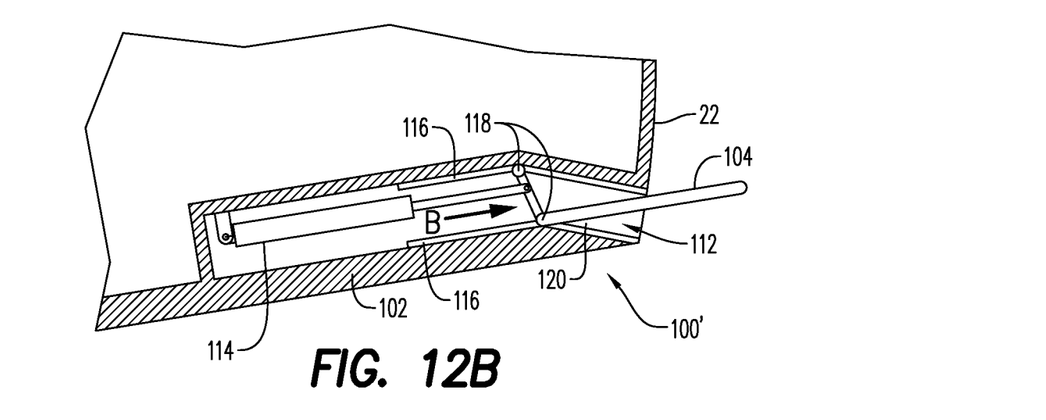
Figure 12C:
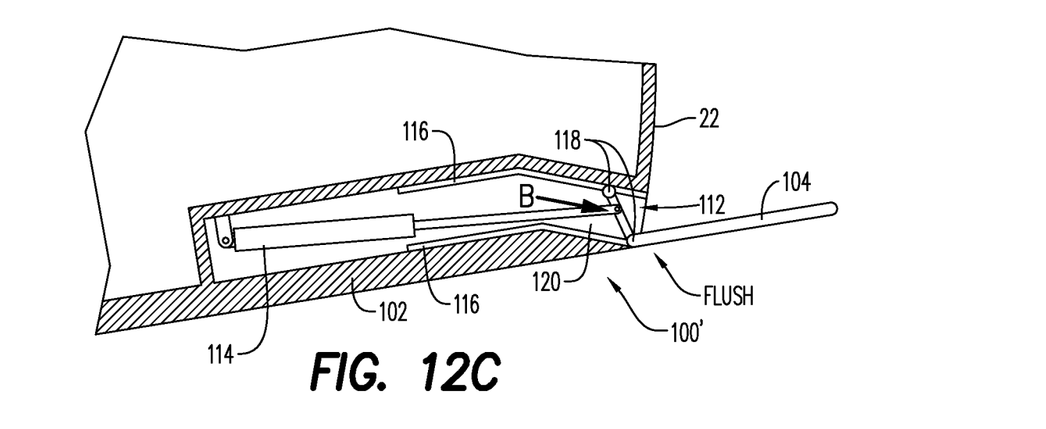

A further exemplary system for deployment of the active rear diffuser assembly 100 is shown in FIGS. 12A-12C, it being understood by one skilled in the art that the same or similar system can be used for deployment of active rear diffuser assembly 100'. In this system, the diffuser chamber 106 further includes an angled portion 120 having an opening 112 through which the active panel 104 passes to be stowed in the diffuser chamber 106. Guide rails 116 are provided on the upper and lower surfaces of a portion of the chamber 106 and the angled portion 120 together with guide rollers 118 which permit an articulated movement during deployment. An actuator 114 is used to move the active panel 104 from the stowed position within the slot 112 to the deployed extended position protruding from the slot. Actuator 114 is illustrated as a piston cylinder but the actuator may include a motor, gears, links or any other type of system capable of providing the required movement. As shown in FIG. 12A, the movable active panel 104 is stowed within the chamber 106 and does not extend substantially beyond the end surface of the vehicle bumper 22. When activated, once the vehicle reaches the predetermined speed, actuator 114 pushes the active panel 104 rearwardly. The first movement shown by arrow B is a translational movement as shown in FIG. 12B where the active panel 104 is moved rearwardly in-line with the stowage position. Thereafter, as shown by arrow B in FIG. 12C, the guide rollers 118 follow along the rails 116 to angle the active panel 104 downward and allow it to continue to be deployed outward from angled portion 120 of the slot 112. When fully deployed, the active panel 104 obtains a position substantially flush with the fixed portion 102 of the diffuser assembly 100".

Figure 15A:
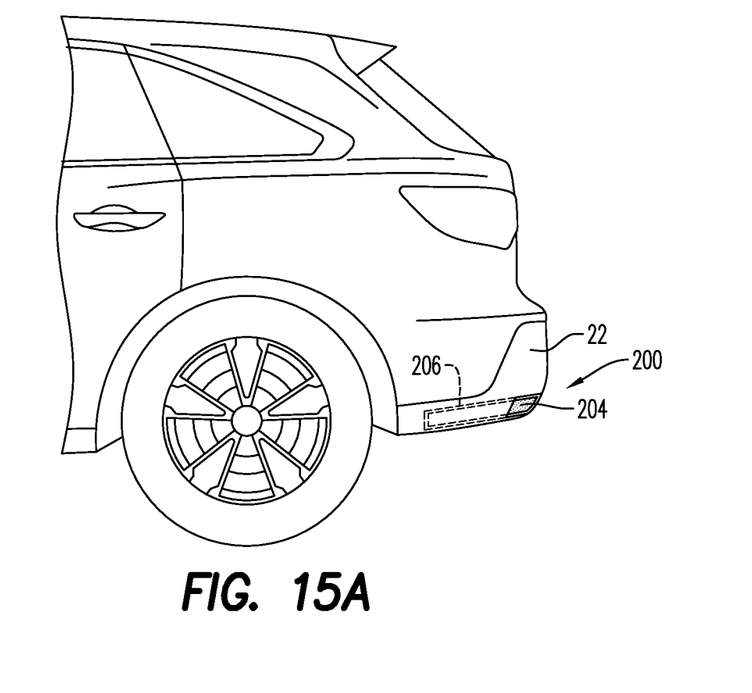
FIG. 15A is a schematic side view of an active rear diffuser for a vehicle in a stowed position according to a fourth exemplary embodiment of the disclosure herein.
Figure 15B:
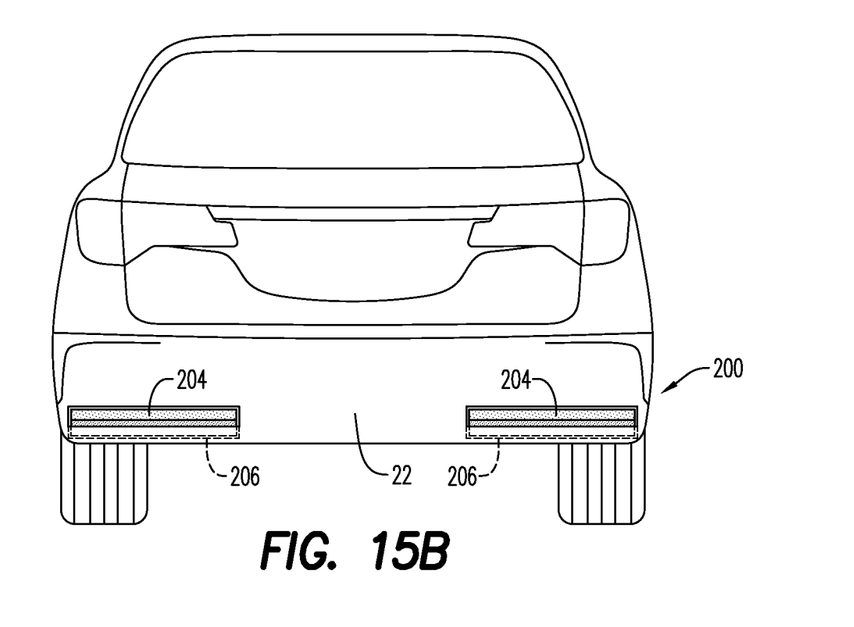
FIG. 15B is a schematic rear view of an active rear diffuser for a vehicle in a stowed position according to a fourth exemplary embodiment of the disclosure herein.
Figure 16A:
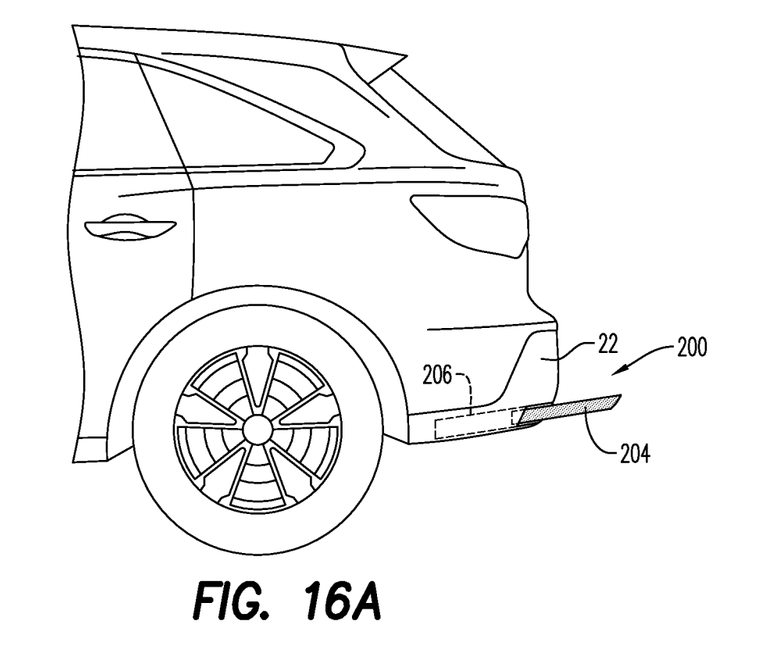
FIG. 16A is a schematic side view of an active rear diffuser for a vehicle in a deployed position according to the fourth exemplary embodiment of the disclosure herein.
Figure 16B:
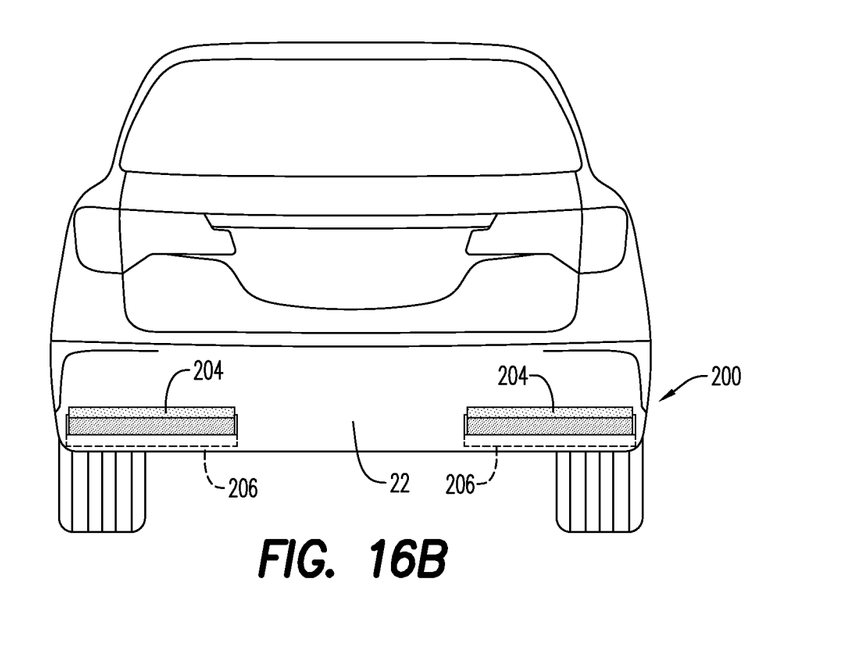
FIG. 16B is a schematic rear view of an active rear diffuser for a vehicle in a deployed position according to the fourth exemplary embodiment of the disclosure herein.

An active rear diffuser assembly generally designated by reference numeral 200 is shown in a stowed position in FIGS. 15A and 15B and in a deployed position in FIGS. 16A and 16B, according to a further exemplary embodiment of the disclosure herein. Diffuser assembly 200 redirects the topside air flow in the rearwards direction for better alignment with underbody air flow and thereby reduces mixing losses with underbody flow and improves drag. The active diffuser assembly 200 includes two or more active panels or extension flaps 204 configured for sliding movement relative to the vehicle bumper 22. Each of the flaps 204 have a nominal width of approximately one-third of the overall vehicle width and each is disposed, by way of example, on an outboard edge of the vehicle bumper 22 as illustrated in the exemplary embodiment of the disclosure. Other sizes and placements are of course also possible within the scope of the disclosure based upon the configuration of the vehicle and as required to achieve the desired drag reduction. The diffuser assembly 200 further includes two or more chambers 206 in the bumper 22 in which the active flaps 204 are contained when in the stowed position, thus substantially concealing the active flaps 204 from view when not in use. This is desirable because it allows the vehicle to have a diffuser assembly without altering the intended design styling of the vehicle or otherwise detracting from the aesthetic look of the vehicle. That is, when stowed, the active flaps do not form part of the overall visible external surface of the vehicle and do not protrude significantly beyond the vehicle bumper. The active flaps 204 are configured for sliding movement though any of the mechanisms discussed herein or any other type of arrangement which allows for the sliding movement of the active flaps 204 relative to the chambers 206.

The active flaps 204 extend rearward a sufficient distance to separate the rear wake recirculation flow from the underbody, by redirecting the flow traveling downwards along the rear bumper in the rearwards direction. This allows more parallel mixing with the underbody airflow and reduces flow energy losses, which leads to lower drag. In this embodiment, there is a minimal gap at the interface with the bumper in order to maximize this effect. The length of the active flaps, merely by way of example, is on the order of 100-300 mm, but other lengths could of course also be used. The extension of the flaps 204 are also nominally in a straight or horizontal direction but a certain degree of curvature or other features could be utilized in order to improve the airflow redirection. More particularly, the flaps 204 may extend at an angle range of approximately −10 to 10 degrees from a straight deployment direction from the bumper 22.

Figure 17A:
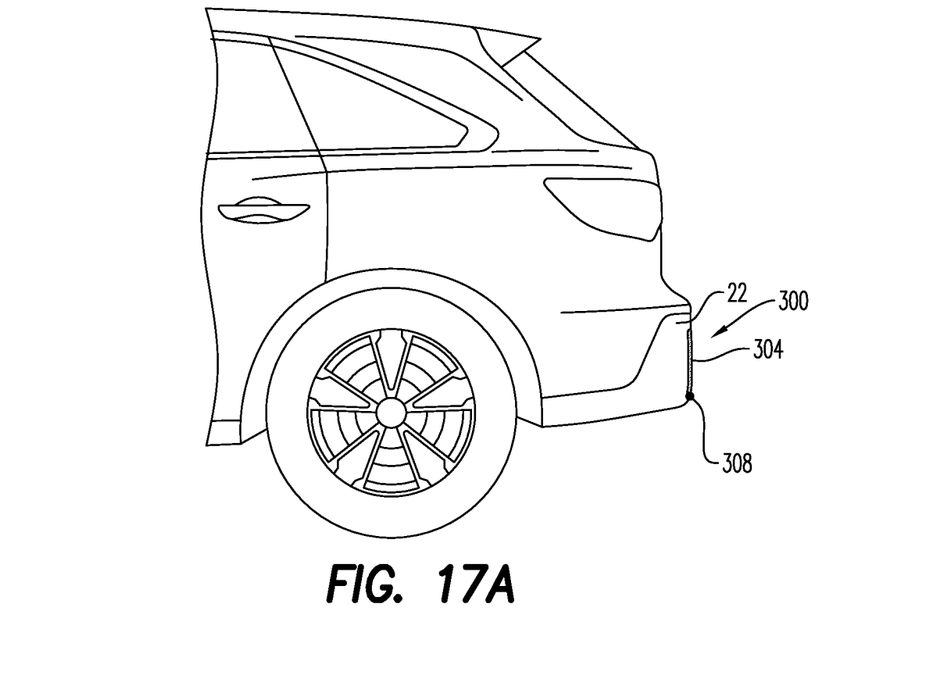
FIG. 17A is a schematic side view of an active rear diffuser for a vehicle in a stowed position according to a fifth exemplary embodiment of the disclosure herein.
Figure 17B:
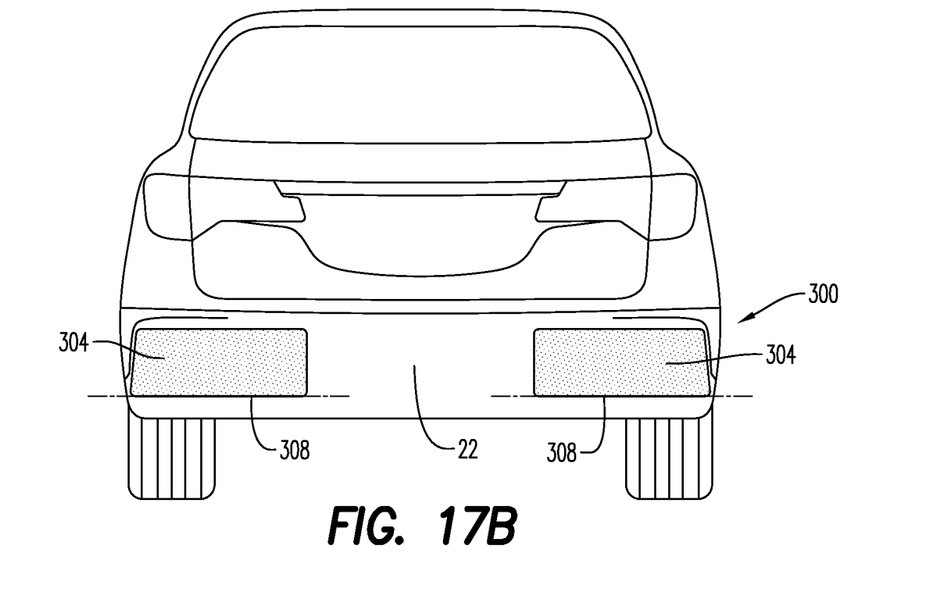
FIG. 17B is a schematic rear view of an active rear diffuser for a vehicle in a stowed position according to a fifth exemplary embodiment of the disclosure herein.
Figure 18A:
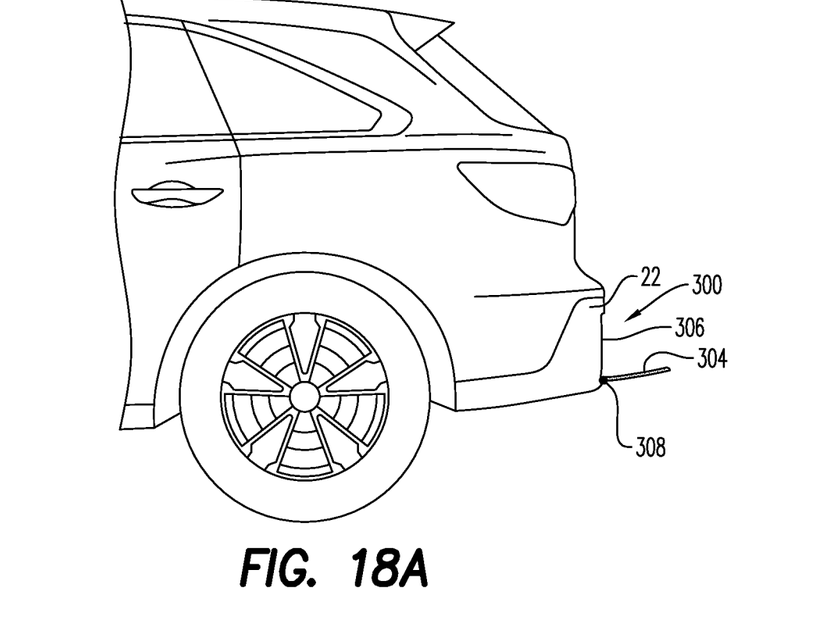
FIG. 18A is a schematic side view of an active rear diffuser for a vehicle in a deployed position according to the fifth exemplary embodiment of the disclosure herein.
Figure 18B:
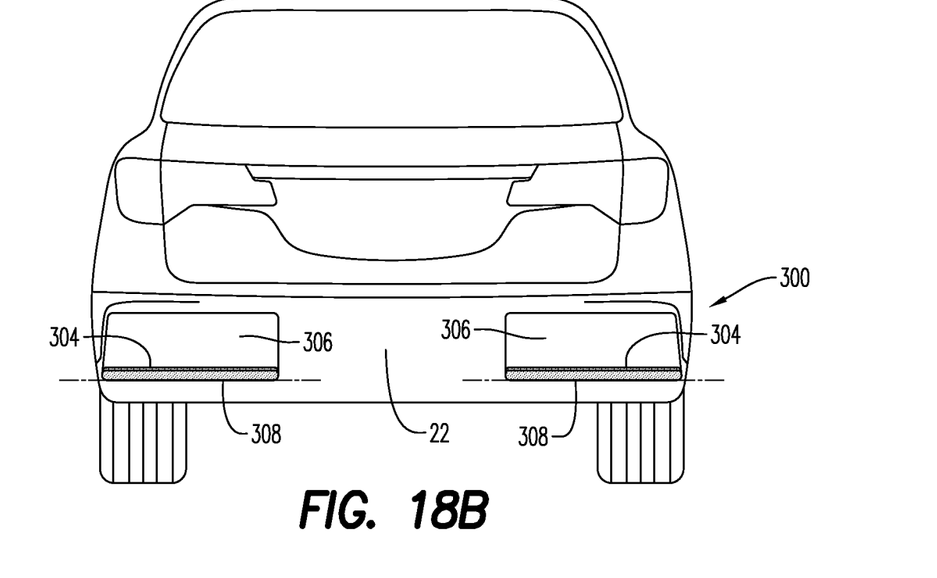
FIG. 18B is a schematic rear view of an active rear diffuser for a vehicle in a deployed position according to the fifth exemplary embodiment of the disclosure herein.

A further exemplary embodiment of an active rear diffuser assembly is designated generally by reference numeral 300 and shown in a stowed position in FIGS. 17A and 17B and in a deployed position in FIGS. 18A and 18B, according to the disclosure herein. Diffuser assembly 300 similar to the previously described embodiments redirects the topside air flow in the rearwards direction for better alignment with underbody air flow and thereby reduces mixing losses with underbody flow and improves drag. The active diffuser assembly 300 includes two or more active panels or extension flaps 304 configured for pivoting movement relative to the bumper 22. Each of the flaps 304 have a nominal width of approximately one-third of the overall vehicle width and each is disposed, by way of example, on an outboard edge of the vehicle bumper 22 as illustrated in the exemplary embodiment of the disclosure. Other sizes and placements are of course also possible within the scope of the disclosure based upon the configuration of the vehicle and as required to achieve the desired drag reduction. The diffuser assembly 300 further includes two or more indentations or recesses 306 in the bumper 22 into which the active flaps 304 are pivoted when in the stowed position, thus blending the active extensions 304 with the shape of the bumper 22 when not in use. This is desirable because it allows the vehicle to have a diffuser assembly without altering the intended design styling of the vehicle or otherwise detracting from the aesthetic look of the vehicle. That is, when stowed, the active flaps do not protrude significantly beyond the vehicle bumper. The active flaps 304 are configured for pivoting or rotating movement. This movement in the exemplary embodiment is about a hinge 308 disposed along a lower edge of each of the bumper indentations 306, although any mechanism or other type of arrangement which allows for the pivoting movement of the active flaps 304 relative to the indentations 306 could be used.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle comprising:
   a vehicle body including a front portion, an opposing rear end portion and an underbody portion configured to face a road surface; and
   an active diffuser assembly disposed on the underbody portion and configured to control ambient airflow passing under the vehicle body, the active diffuser assembly including:
   a fixed panel disposed on the vehicle underbody;
   a movable active panel disposed adjacent the fixed panel and configured for selective movement to be deployed away from the vehicle body and to be retracted toward the vehicle body for stowage; and
   an actuator configured to deploy and retract the movable active panel;
   wherein the fixed panel and the movable active panel define a continuous plane when the movable panel is in a stowed position; and
   wherein the movable active panel is configured to be deployed in a rearward translational movement in-line with the fixed panel.

2. The vehicle according to claim 1, wherein the fixed panel is disposed above the movable active panel when the movable active panel is deployed.

3. The vehicle according to claim 1, wherein the fixed panel is disposed below the movable active panel when the movable active panel is deployed.

4. The vehicle according to claim 1, wherein the actuator is configured to deploy the movable active panel away from the vehicle body when a predetermined input is received relative to one or more of the following conditions: vehicle speed, temperature, humidity, rain, ice, snow and GPS location.

5. The vehicle according to claim 1, wherein the movable active panel is configured to be deployed a predetermined distance in a rearward direction such that a gap is defined in a longitudinal direction between the rear end portion of the vehicle and the movable active panel.

6. The vehicle according to claim 1, wherein the movable active panel is configured to also be deployed in a downward direction towards the road surface.

7. A vehicle comprising:
   a vehicle body including a front portion, an opposing rear end portion and an underbody portion configured to face a road surface; and
   an active diffuser assembly disposed on the underbody portion and configured to control ambient airflow passing under the vehicle body, the active diffuser assembly including:
   a fixed panel disposed on the vehicle underbody;
   a movable active panel disposed adjacent the fixed panel and configured for selective movement to be deployed away from the vehicle body and to be retracted toward the vehicle body for stowage; and
   an actuator configured to deploy and retract the movable active panel;
   wherein the fixed panel and the movable active panel define a continuous plane when the movable panel is in a stowed position; and
   wherein the movable active panel has an airfoil shape and a pocket defined on the fixed panel has a substantially similar airfoil shape such that the movable active panel is configured to nest within the pocket when the movable active panel is stowed.

8. The vehicle according to claim 1, wherein, when the movable active panel is deployed, the movable active panel is configured to be tilted upwards or downwards.

9. A vehicle comprising:
  a vehicle body including a front portion, an opposing rear end portion and an underbody portion configured to face a road surface; and
  an active diffuser assembly configured to control ambient airflow passing under the vehicle body, the active diffuser assembly including:
    a fixed diffuser portion disposed on the vehicle body and configured to partially define a diffuser chamber including an opening positioned at the rear end portion of the vehicle body;
    a movable active panel disposed within the diffuser chamber and configured for selective movement to be deployed outward from the opening of the diffuser chamber and away from the vehicle body and to be retracted inward through the opening into the diffuser chamber and toward the vehicle body for stowage; and
    an actuator system configured to deploy and retract the movable active panel from within the diffuser chamber.

10. The vehicle according to claim 9, wherein the diffuser chamber is configured such that the movable active panel is disposed a predetermined distance above a bottom edge of the fixed diffuser portion when fully deployed.

11. The vehicle according to claim 10, wherein the actuator system includes an actuator and a plurality of rails to guide the movable active panel in a longitudinal direction relative to the fixed diffuser portion.

12. The vehicle according to claim 9, wherein the diffuser chamber includes an angled portion and is configured such that the movable active panel is substantially flush with the fixed diffuser portion when fully deployed.

13. The vehicle according to claim 12, wherein the actuator system includes a linear actuator, a plurality of rails, and a plurality of guide rollers to guide the movable active panel in a first direction within a portion of the chamber and in a second direction along the angled portion of the chamber.

14. A method for deploying an active diffuser assembly on a vehicle comprising:
  providing an active diffuser assembly including a fixed diffuser portion and a movable active panel;
  positioning the fixed diffuser portion on the vehicle;
  actuating the active diffuser assembly to deploy the movable active panel away from the vehicle body;
  deploying the movable active panel in a rearward translational movement in-line with the fixed diffuser portion and away from the vehicle body a predetermined amount and forming a gap between the vehicle and the movable active panel such that ambient airflow passes over a first upper surface of the movable active panel and a second lower surface of the movable active panel.

15. The method according to claim 14, further comprising deploying the movable active panel when the vehicle is travelling at a speed greater than a predetermined speed.

16. The method according to claim 14, wherein deploying the movable active panel includes extending the movable active panel away from the vehicle body and tilting the movable active panel in an upwards or downwards direction.

17. The method according to claim 14, further comprising retracting the movable active panel towards the vehicle body.

18. The method according to claim 14, further comprising providing the movable active panel with a plurality of projecting fins.

19. The method according to claim 17, further comprising providing a diffuser chamber including an opening positioned at a rear end portion of the vehicle body, wherein retracting the movable active panel includes retracting the movable active panel inward through the opening into the diffuser chamber and toward the vehicle body for stowage.

20. The method according to claim 14, further comprising deploying the movable active panel in a downward direction towards the road surface.

* * * * *